United States Patent [19]

West et al.

[11] 3,856,891

[45] Dec. 24, 1974

[54] INHERENTLY FLEXIBLE, HIGH STRENGTH SHEETING FROM BLENDS OF A SUSPENSION CHLORINATED OLEFIN POLYMER AND POST-CHLORINATED POLYVINYL CHLORIDE

[75] Inventors: Charles W. West, Cookeville, Tenn.; Glen H. Graham, Ashland, Ohio; James S. Kennedy, Baton Rouge, La.

[73] Assignee: The Dow Chemical Company, Midland, Mich.

[22] Filed: Oct. 9, 1973

[21] Appl. No.: 404,844

Related U.S. Application Data

[63] Continuation of Ser. No. 235,006, March 15, 1972, abandoned, which is a continuation-in-part of Ser. No. 51,680, July 1, 1970, abandoned.

[52] U.S. Cl.... 260/897 C, 260/28.5 D, 260/45.7 R, 260/45.75 K, 260/94.9 H, 260/889

[51] Int. Cl. .............................................. C08f 29/24
[58] Field of Search .................... 260/897 C, 94.9 H

[56] References Cited
UNITED STATES PATENTS

| | | | |
|---|---|---|---|
| 3,006,889 | 10/1961 | Frey........................... | 260/897 C |
| 3,299,182 | 1/1967 | Jennings et al. ..................... | 260/897 |
| 3,454,544 | 7/1969 | Young et al. ....................... | 260/88.2 |
| 3,459,692 | 8/1969 | Buning et al.......................... | 260/23 |

Primary Examiner—Murray Tillman
Assistant Examiner—C. J. Seccuro
Attorney, Agent, or Firm—Ronald G. Brookens

[57] ABSTRACT

This invention relates to sheeting materials characterized by having high tensile strength and unexpectedly low stiffness which sheeting is prepared from blends consisting essentially of major amounts of certain suspension chlorinated olefin polymers and minor amounts of post-chlorinated polyvinyl chloride.

6 Claims, No Drawings

INHERENTLY FLEXIBLE, HIGH STRENGTH SHEETING FROM BLENDS OF A SUSPENSION CHLORINATED OLEFIN POLYMER AND POST-CHLORINATED POLYVINYL CHLORIDE

This application is a continuation of Ser. No. 235,006, filed Mar. 15, 1972, now abandoned, which is a continuation-in-part of Ser. No. 51,680, filed July 1, 1970, now abandoned.

BACKGROUND OF THE INVENTION

In water conservation systems wherein irrigation canals and ditches are utilized for conveying water, it is essential that the surface of the pond, canal or ditch be covered so as to prevent loss of water by drainage or seepage which would otherwise occur through the soil. Application of such covering material to prevent erosion or soil may also be desirable in some instances. Further, it is also desirable to provide protective linings for pits and the like containing chemicals such as acids, bases, brines, among others and for structures such as dams and the like.

To that end, one expedient heretofore employed has been concrete linings in a layer of about three inch thickness. Another material that has been used for this purpose is so-called asphalt plank which comprises sheets or boards, about one-half inch thick, formed from wood or other cellulosic fiber and saturated with asphalt. Both of these lining materials are relatively costly and entail a somewhat cumbersome procedure for application and use.

It is, therefore, an object of this invention to provide high strength protective liner material in the form of an inherently flexible sheet material which can be supplied in the form of rolls thereof to the job site and from which the material may be readily unrolled and applied as membrane to serve as a protective lining.

Another object is to provide for such purposes a sheet material which exhibits a high degree of flexibility (both on aging and over a considerble temperature range), high bursting tensile and tear strength properties (sufficient to resist mechanical injury in service), excellent weathering ability, the ability to be manufactured and handled without cracking and which is essentially inert to acids, bases and salts.

Still another object is to provide a material for the purposes set forth herein which can readily be installed as a protective liner without requiring the use of special equipment such as required for installing concrete lining.

In the bulk storage of industrial chemicals, use has been made of flexible containers prepared from sheets of various thermoplastic resins such as: the polymers of vinyl chloride, synthetic rubbers including butyl rubber and neoprene and the like, and composite materials such as neoprene coated nylon fabric. The prior known materials, however, each have some serious recognized shortcomings. For example, containers made from materials such as polyvinyl chloride sheeting have a tendency to stiffen upon aging with resultant cracking or rupture. This loss of flexibility is due at least in part to a gradual volatilization or release of the necessary plasticizing components from the polymeric sheeting. Further, sheeting prepared from synthetic rubber, such as butyl rubber or neoprene and the like, generally require vulcanization for purpose of fabrication; have poor weathering properties; are undesirably flammable; and are generally incapable of being joined into larger sheets in the absence of adhesives. Further, containers made from polyolefin sheeting, e.g., polyethylene, are generally incapable of being welded into composite structures utilizing conventional dielectric or solvent welding techniques.

It is, therefore, an object of this invention to provide flexible, long-lived containers for industrial chemicals.

Another object is to provide such containers from individual sheets which may be easily and effectively joined together by solvent welding or dielectric, ultrasonic, or resistance welding techniques, in the absence of adhesives.

It is standard construction practice to overcome leakage problems by using flashing in valleys between intersecting roof surfaces, over fascia boards, at joints such as those involving masonry, metal or wood (as where chimneys or vent pipes intersect a roof or where masonry parapet walls abut a roof) or between wooden and masonry members of sill structures at floors or windows, as well as in many other places where similar problems exist. The nature of the flashing employed generally varies according to the type and intended permanence of the structure. The more durable flashings heretofore employed have been sheet copper or sheet lead. Less permanent flashings can be made of galvanized iron, aluminum or a tar — impregnated "roofing paper." Recently, in quality installation, particular types of resilient plastic sheet materials have been used for the purpose.

Each of the conventional flashing has some serious recognized shortcomings. Thus, the sheet metal flashings are difficult to seal tightly, especially at joints involving wooden structural supports. Nails driven through such flashings to hold them in place establish potential leaks. These, of course, tend to become progressively worse if electrolysis occurs at the point of contact between the nail and the flashing.

There are atmospheric conditions, especially in factory districts or in coal-burning communities, which exert an accelerated corrosive effect on metal flashings. Joints in metal flashing must be made by welding or soldering. Such operations are slow and consequently expensive and, in addition, require considerable skill for proper results.

Flashings made of roofing paper are weak. As they age, they tend to develop leaks around nail holes. They also, particularly on aging, become brittle. They are, in addition, combustible.

In attempting to overcome some of the defects of prior flashing materials, some use has been made of natural rubber sheeting. While having a reasonable level of flexibility, it is not long-lived, as it oxidizes and becomes brittle and weak in the course of a very few years. In addition, use has been made of sheeting prepared from synthetic rubber, e.g., butyl rubber sheeting. This type of sheeting, however, requires vulcanization for fabrication, is generally incapable of being joined into larger sheets in the absence of adhesives and is difficultly formulated to provide flame-resistant materials.

Particular types of plasticized, resilient, synthetic thermoplastic sheets formed from vinylidene chloride interpolymers have, despite their comparatively recent origin, been used as flashing with considerable satisfaction and success. Although these prior types of flashing made from synthetic resins give very good service when installed in fairly mild climates, a tendency to stiffen is frequently encountered when such materials are installed in areas where extremes in temperature and/or humidity exist. This loss of flexibility is due at least in part to a gradual volatilization or release of the plasticizing component from the flashing composition. Similar problems are also encountered when using flashing based on plasticized polyvinyl chloride resins.

Many of these same disadvantages of prior known flashing or sheeting are apparent when such materials are used as membranes to cover entire roofs, or to act as water and water vapor barriers under concrete slabs and/or when placed adjacent to sub-surface walls, etc.

Accordingly, it is still another object of this invention to provide a long-lived, high strength, inherently resilient and noncombustible flashing or membrane for use in construction, which material additionally is: corrosion resistant, easily sealed to other sheets of like material by adhesives, solvent welding or dielectric, ultrasonic, or resistance welding techniques, capable of forming a tight seal around nails or other fastening devices driven through it, is not damaged or significantly deformed when subjected to temporary localized stress, and which is compatible with conventional roofing materials such as pitch and asphalt.

Another object is to provide such a flashing or membrane material which does not require the addition or presence of elasticizing ingredients, and which retains substantially its original flexibility under a wide variation of climatic and environmental conditions over extended periods of time.

It is also standard construction practice to apply vapor barrier materials to insulation, e.g., to sheeting or membranes of foamed polymers such as the polyurethanes and the like. For example, when applying a vapor barrier for cold insulation, it is common practice to utilize various mastics, usually reinforced with a layer of glass cloth, for this purpose. However, the use of such materials require considerable time consuming care in application to insure that the vapor barrier is free from pinholes and that the minimum thickness is not less than specified. Further, when constructing insulation units, as for use in preparing insulated roof structures, and the like, it is necessary to easily and effectively join such units in a manner as to exclude moisture.

It is, therefore, another object of this invention to provide as a vapor barrier for insulating materials, an inherently flexible, self-extinguishing, solvent weldable sheeting having very low water vapor permeability, which is economically priced, and which may be easily and effectively joined together by solvent welding, or dielectric, ultrasonic, or resistance welding techniques in the absence of adhesives, to form moistureproof joints or seals.

It is yet another object to provide high strength, inherently flexible sheeting materials for use in wire and cable coatings, as automobile dashboard coverings, as upholstery and for use in the fabrication of dust covers and the like.

Other and related objects and advantages will become evident from the following specification and claims.

SUMMARY OF THE INVENTION

In accordance with the above objects, the present invention is directed to thermoplastic sheeting material of high tensile strength and unexpectedly low stiffness, i.e., inherent flexibility, wherein such sheeting material is prepared from blends consisting essentially of:

1. greater than 70 parts by weight of a chlorinated olefin polymer prepared by the suspension chlorination of an olefin polymer having an essentially linear structure, said olefin polymer being selected from the group consisting of polyethylene and interpolymers composed of at least about 90 mole percent ethylene with any remainder being at least one ethylenically unsaturated comonomer; such chlorinated olefin polymer containing from 25 to 50 and preferably between about 35 and 48 weight percent of chemically combined chlorine wherein the chlorination product is characterized by regions in which a minor portion of the chlorine atoms along the polymer chain are distributed in a non-statistical, block-type fashion, while the remainder of the polymer is chlorinated in a random manner characteristic of that obtained by solution chlorination techniques, and wherein the chlorinated olefin polymer has a relative crystallinity of less than about 10 percent and forms individual sheeting materials having a tensile strength of at least about 1,000 pounds per square inch, an elongation of between about 200 and 1,000 percent and a 100 percent modulus of between about 150 and 400 pounds per square inch; and 2. at least about 5 parts by weight of a post-chlorinated polyvinyl chloride containing from about 60 to 72 percent chlorine; said thermoplastic sheeting material having a thickness of about 0.005 to 0.25 of an inch, an ultimate tensile strength of at least about 1,200 pounds per square inch at 23°c. and a stiffness of less than about 2,500 inch pounds at 25°C. as determined by ASTM Test Number D-797.

DESCRIPTION OF THE PREFERRED EMBODIMENTS

The chlorinated olefin polymers employed in the polymeric blends used for preparing the sheet material of the present invention are obtained by the practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers, to a desired total of combined chlorine content, wherein such polymer is first chlorinated at a temperature above its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2°C. below its crystalline melting point for a period sufficient to provide a combined chlorine content of up to about 50 weight percent, based on the total weight of the polymer.

The temperature at which the chlorination normally leads to an agglomeration of the polymer depends to a large extent on the nature and the molecular weight of the olefin polymer to be chlorinated. In the case of crystalline and predominantly straight chain polyethylenes having a branching of the chains of less than 1 methyl group per 100 carbon atoms and a density of at least 0.94 i.e., polyethylenes which are predominantly obtained by the low pressure synthesis, the aforesaid temperature is above 95°C., in particular above 100°C. or even above 110°C. In the case of polyethylenes having a relatively marked branching of the chains and a lower density and which are normally prepared by polymerizing ethylene under a high pressure, the said temperature limit is lower, namely, at about 65°C.

Further, it has been found that if the first stage chlorination is carried out to an amount exceeding about 23 weight percent chlorine, based on the total weight of the polymer, excessive amounts of polymeric materials having the chlorine substituents present in considerable block-like concentration or grouping along the polymer molecules are produced with resultant losses in elasticity and resistance to the deleterious effects of heat.

Additionally, it has been found that the sequential chlorination must be conducted at a temperature above that temperature employed for the first chlorination, but below the crystalline melting point of the polyolefin starting material, to provide materials having the combination of desirable properties described herein. In this regard, it has been found that the temperature employed in such sequential chlorination must necessarily be greater than that employed in the initial chlorination to prevent the retention of excessive undesirable crystallinity with resultant formation of nonuniformly chlorinated polymer; furthermore, if such temperature is above the crystalline melting point of the polymer being chlorinated, particularly when using polymer having a molecular weight of between about 20,000 and 300,000, it has been found that particle size growth is greatly accelerated with resultant development of undesirable agglomeration of the polymer material.

Thus, the temperature employed in the herein described sequential suspension chlorination is that temperature at which a desirable balance between particle growth and destruction of crystallinity is obtained. Such temperature is, therefore, highly critical and is advantageously individually determined with respect to the polyolefin used, the desired chlorine content, and the desired physical properties of the so-formed chlorinated polymeric material.

Still further, it has been found that in this critical temperature range, particularly in the upper portions of it, control of particle size is very essential to the process. Unless particle growth is controlled by some means, agglomeration of the particles may proceed to the point where lumps of several inches or more in diameter are formed. These large lumps make it practically impossible to wash out entrained acid and the heat resistance of the product is lessened. The very low surface area of these lumps also makes it impossible to obtain good distribution of the chlorine atoms in the polymer.

Preferably, the olefin polymers to be chlorinated are those distinct species and varieties of essentially linear and unbranched highly porous polymers containing at least about 90 mole percent ethylene in the polymer molecule with a remainder being one or more ethylenically unsaturated comonomers, such polymers being prepared under the influence of catalyst systems comprising admixtures of strong reducing agents such as triethyl aluminum and compounds of groups IV-B, V-B and VI-B metals of the Periodic System, such as titanium tetra-chloride, and the like, and having a molecular weight less than about 1,000,000 and preferably between about 20,000 and 300,000, to provide for optimum flexibility, i.e., a 100 percent modulus of less than about 500 psi and preferably less than about 300 psi.

Exemplary of useful ethylenically unsaturated comonomers are the nonaromatic hydrocarbon olefins having 3 or more carbon atoms such as propylene, butene-1 and 1,7 octadiene and the like; cycloaliphatic olefins such as cyclopentene and 1,5-cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

It is to be pointed out, however, that conventionally prepared low density, branched polyolefins may often be advantageously chlorinated by the process of the present invention, providing such materials are available in finely comminuted form.

The inert liquid which is employed to suspend the finely divided polymer in the suspension chlorinating procedure of the present invention may be any liquid which is inert to the polymer and is not affected to an appreciable extent by chlorine, or which, while wetting the polymer will not have an appreciable solvent effect on it. While water may be employed with especial advantage as an inert suspending liquid for polyolefins to be chlorinated, the polymer may also be suspended in other inert liquids.

A variety of wetting agents, including sulfonates, sulfates, polyphosphates and other types of ionic and noionic surfactant materials may be suitably employed, if desired, to assist the inert suspending liquid, particularly when it is water, to wet the polymer. Such materials as sodium lauryl sulfate and alkyl aryl polyether alcohols are illustrative of specific wetting agents that may be utilized. The employment of a wetting agent facilitates the suspension and uniform distribution of the polymer during the chlorination. In some cases, however, it may not be necessary to employ wetting agents, especially when a freshly prepared polymer is employed that is undried after its preparation or when efficient agitation is available for producing and maintaining the polymer slurry.

If it is desired to accelerate the chlorination rate, the reaction may be assisted by the employment of small quantities of catalysts, such as the free-radical types and/or ultra-violet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azo-type compounds and peroxides selected from the group of free-radical catalyst consisting of tertiary butyl peroxide; tertiary butyl hydroperoxide; and the like may advantageously be emloyed. Preferably, when catalysts are employed, such catalyst should be one which has an efficient rate of decomposition in the suspending medium in which it is dissolved in the required temperature range. In this regard, it may be advantageous to employ a mixture of such catalysts, one of which has a temperature of efficient decomposition at or near the optimum initial chlorination temperature, and the other having an efficient decomposition at or near the optimum sequential chlorination temperature. Such catalysts may be added in a single step or continuously depending upon the reaction conditions and catalyst used.

Part of the suspension chlorination procedure of the present invention may be carried out at the atmospheric pressure; however, best results are generally obtained wherein super-atmospheric pressures are employed. Such chlorination pressure is not critical except as necessary to obtain an efficient rate of reaction. In this regard, it is pointed out that for a given catalyst or admixture thereof, at a given concentration in the suspending medium, the reaction rate is conveniently controlled by the rate of feed of chlorine and/or its partial pressure in the reaction vessel.

After an olefin polymer has been suspension chlorinated to a desired degree, it may easily be filtered from suspension in the inert suspending liquid and washed and dried to prepare it for subsequent use.

The entire chlorination procedure or any desired part of it may be carried out batchwise or by continuous processing arrangements. For batch operations, it is ordinarily suitable to employ conventional autoclaves and kettles or the like for conducting the reaction. However, it may also be conveniently conducted in a continuous process by one of several suitable techniques. For example, it may be conducted by countercurrent movement of the reactants through either horizontally or vertically disposed reactors which may be in the form of tubes and towers, or by using a cascading principle with a series of interconnected reaction chambers.

Substantially quantitative yields, based on the weight of the polymer to be chlorinated, may be frequently obtained by the chlorinating technique of the present invention. The attainment of such yields, as has been indicated, may often be facilitated by the practice of recycling techniques for unreacted portions of the chlorine and by conducting the involved reactions at more moderate rates.

The after-chlorinated polyvinyl chlorides employed for use in the present invention are any such material containing from about 60 to 72 and preferably about 68 weight percent chlorine. Exemplary of useful materials are those described in U.S. Pat. No. 3,299,182 issued Jan. 17, 1967 and U.S. Pat. No. 3,459,692 issued Aug. 5, 1969.

Stabilizers may also be included in the blends to protect the chlorinated polymer constituents against possible decomposition by the heat of processing or by subsequent exposure of fabricated sheet material to climatic and environmental conditions of use. Suitable stabilizers include those materials conventionally employed in the preparation of vinyl polymer and copolymer sheet compositions, e.g., organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the chlorinated polymer constituents. Other conventional additives, such as nonepoxidized fatty acids and oils, and low molecular weight polymers and waxes may also be employed, if desired.

Although the chlorinated polymers employed for the purposes of the present invention are inherently resistant to burning, it may in some instances be advantageous to incorporate minor accounts, i.e., from about 1 and 10 parts per 100 parts of chlorinated polymer of one or more flame-retarding agents, e.g., oxides of antimony and/or various halogenated materials such as tetrabromophthalic anhydride, perchloropentacyclodecane, tris (2,3-dibromopropyl) phosphate, tetrabromo bisphenol-A, among many others.

It is generally unnecessary to add conventionally employed plasticizers to the compositions from which the sheet-like materials of the present invention are formed, however, plasticizers conventionally employed for vinyl polymers may be used in concentrations less than about 15 percent by weight of polymer as processing aids if desired.

The sheet materials of the present invention may be prepared by conventional techniques wherein the chlorinated polymer constituents are blended with each other as well as the desired fillers and stabilizers, etc., substantially in the manner as conventionally employed in preparing vinyl chloride polymer and copolymer sheeting compositions. Thus, for example, the necessary ingredients may be initially dry blended in a mixer such as a ribbon blender and subsequently milled as on a two-roll compounding mill at roll temperatures between about 240° and 400°F. until the mixture becomes homogeneous. The blend may then be extruded into sheet form or calendered to give the desired sheet thickness. In general, sheet-like structures of this invention have a thickness of between about 0.005 and 0.25 of an inch and preferably between about 0.010 and 0.1 of an inch; an ultimate tensile of at least about 1,200 psi at 23°C., and a stiffness of less than about 2,500 inch pounds as determined at 25°C. by ASTM Test No. D-797.

It is to be noted that the present invention contemplates utilization of such sheet-like structures in both a substantially unvulcanized or vulcanized form.

It is further to be understood that the present invention contemplates utilization of the sheet-like structures as defined herein, in lamination with one or more reinforcing materials such as woven or nonwoven fabrics prepared from naturally occurring materials including glass fibers, wool, cotton, hemp, jute, and the like, and synthetic materials such as polyamide, polyesters, and acrylics among other materials.

It is still further to be understood that the present invention contemplates utilization of the sheet-like structures of this invention in the form of sheets or tarpaulins which are capable of being welded together by application of solvents such as methylethyl ketone, toluene, xylene and the like, or by conventional dielectric or resistance welding techniques. Such materials are also susceptible to adhesion with conventionally employed adhesives.

The following examples, wherein all parts and percentages are to be taken by weight, illustrate the present invention but are not to be construed as limiting its scope.

EXAMPLE 1

A. Preparation of the Chlorinated Olefin Polymer

In each of a series of experiments, an aqueous slurry comprising from about 3,200 to 3,600 grams of water and 160 to 180 grams of a polyethylene having an essentially linear and unbranched molecular structure containing less than about 1 methyl group per 100 methylene units in its molecule; a density of about 0.96; an average molecular weight of about 67,000 and which had been prepared using a catalyst composed of triisobutyl aluminum and titanium tetrachloride; was charged to a 1½ gallon autoclave with from 6.4 to 7.2 grams of calcium chloride; from 3.2 to 3.6 grams of magnesium silicate; about 0.5 cc of ditertiary butyl peroxide; and from about 24 to 27 drops of a commercially available wetting agent. Each charge was then separately chlorinated, as a first suspension chlorination step, under about 13 to 47 psi (gauge) of chlorine pressure at a temperature of between about 82° and 115°C. until a chlorine content of between about 5 and 23 percent was obtained.

Following completion of such first chlorination step, each charge was further individually chlorinated in a second suspension chlorination step, under a gauge pressure of 17-35 psi (as was considered necessary to obtain an efficient rate of chlorination), at a temperature of 126°C. until a total chlorine content of between 35 and 48 percent was obtained.

In a comparative experiment a sample of the nonchlorinated polyethylene polymer was placed in a reactor and dissolved in symmetrical 1,1,2,2-tetrachloroethane. The reactor was flushed with nitrogen and chlorine gas passed therein while maintaining the temperature from 115° to 120°C. during the chlorination, and the reaction mixture agitated. At the end of the reaction period, the reaction mixture was poured into from 5 to 7 times its volume of methanol, which acted as an antisolvent to precipitate the polymer. The solvent was then removed and the residue dried. This sample is hereinafter identified as comparison (A).

The following Table I summarizes the physical properties of the above-described chlorinated polymers and sheet materials prepared from such polymers.

The column headings of the following Tables I, II and III have the following meanings:

| | |
|---|---|
| % Chlorine for Suspension Chlorinated Materials | Determined by titration of HCl in aqueous slurry |
| % Chlorine for Solution Chlorinated Materials | Determined by titration of chloride ions using AgNO₃ |
| % Relative Crystallinity | Ratio of crystalline peak areas to the sum of the amorphous plus crystalline peak area as determined by conventional X-ray diffraction |
| % Elongation | As per ASTM Test No. D-142-61T |
| Tensile Strength, psi | As per ASTM Test No. D-142-61T |
| 100% Modulus | As per ASTM Test No. D-412-62T |

TABLE I

| Run No. | Final % Chlorine | % Rel. Crystallinity | Approximate Tensile Strength | 100% Modulus |
|---|---|---|---|---|
| Comparison (A) (Solution) | | | | |
| 1 | 35 | <2 | 1100 | 95 |
| The Invention | | | | |
| 2 | 35 | <5 | 1500 | 200 |
| 3 | 42 | 5 | 1800 | 250 |
| 4 | 45 | <5 | 1800 | 200 |
| 5 | 48 | 2 | 2500 | 400 |

B. Preparation and Testing of Blends of Chlorinated Olefin Polymers and Post-Chlorinated Polyvinyl Chloride or Nonchlorinated Polyvinyl Chloride In each of a series of experiments, individual polymer blends were obtained by mixing of the following general formulations in a Waring Blendor:

| Formulation Ingredients | Parts by Wt. |
|---|---|
| Chlorinated Olefin Polymer (Runs 2, 3, 4, and 5 of Table I) | 50-100 |
| Post-Chlorinated Polyvinyl Chloride (68% Chlorine, tensile strength of about 12,000 psi and Izod impact of about 0.25 ft./lbs. per inch of notch) | 0-50 |
| Nonchlorinated Polyvinyl Chloride (tensile strength of about 7500 psi and Izod impact of about 0.75 ft./lbs. per inch of notch) | 0-50 |
| Epoxidized Oil | 3 |
| Alkyl tin mercaptide | 4 |
| Processing aid | 3 |
| Polyethylene wax | 0.5 |

Each polymer blend was then fused and mixed for a period of about 10 minutes on a two-roll mill operating at a temperature of about 188°C. Individual test samples about six inches by 10 inches in size were cut from the mill blanket and press polished at 188°C. using a two minute preheat and a one minute press at 10 tons force followed by a three minute cooling cycle at 10 tons force.

Each sample was then tested as follows:

| Each sample was then tested as follows: | |
|---|---|
| Ultimate tensile strength (psi at 23°C.) | ASTM D-412 |
| Stiffness (psi at 25°C.) | ASTM D-797 |

The following Tables II through V set forth the amounts and types of chlorinated polymers used and the physical properties of each blend.

TABLE II

Sheeting from Blends of Suspension Chlorinated Polyethylne (Run 2 of Table I) and Post-Chlorinated Polyvinyl Chloride

| Blend No. | CPE (36% Cl.) (pts. by wt.) | CPVC (pts. by wt.) | Ultimate Tensile (psi at 23°C.) | Stiffness (psi at 25°C.) |
|---|---|---|---|---|
| 6 | 100 | 0 | 1140 | 600 |
| 7 | 90 | 10 | 1280 | 750 |
| 8 | 80 | 20 | 1390 | 1,060 |
| 9 | 70 | 30 | 1400 | 2,480 |
| 10 | 60 | 40 | 1770 | 6,350 |
| 11 | 50 | 50 | 2640 | 13,600 |

TABLE III

Sheeting from Blends of Suspension Chlorinated Polyethlene
(Run 3 of Table I) and Post-Chlorinated Polyvinyl Chloride
or Non-Chlorinated Polyvinyl Chloride

| Blend No. | CPE (42% Cl.) (pts. by wt.) | CPVC (pts. by wt.) | PVC (pts. by wt.) | Ultimate Tensile (psi at 23°C) | Stiffness (psi at 25°C) |
|---|---|---|---|---|---|
| 12 | 100 | 0 | — | 2110 | 560 |
| 13 | 90 | 10 | — | 2280 | 1,100 |
| 14 | 80 | 20 | — | 2480 | 1,100 |
| 15 | 70 | 30 | — | 2690 | 2,350 |
| 16 | 60 | 40 | — | 3040 | 4,800 |
| 17 | 50 | 50 | — | 3480 | 46,100 |
| 18 | 90 | — | 10 | 2025 | 740 |
| 19 | 80 | — | 20 | 2040 | 1,600 |
| 20 | 70 | — | 30 | 2170 | 4,500 |
| 21 | 60 | — | 40 | 2470 | 11,600 |
| 22 | 50 | — | 50 | 2745 | 22,00 |

TABLE IV

Sheeting from Blends of Suspension Chlorinated Polyethylene
(Run 4 of Table I) and Post-Chlorinated Polyvinyl Chloride
or Non-Chlorinated Polyvinyl Chloride

| Blend No. | CPE (45% Cl.) (pts. by wt.) | CPVC (pts. by wt.) | PVC (pts. by wt.) | Ultimate Tensile (psi at 23°C) | Stiffness (psi at 25°C) |
|---|---|---|---|---|---|
| 23 | 100 | 0 | — | 1650 | 490 |
| 24 | 90 | 10 | — | 2040 | 690 |
| 25 | 80 | 20 | — | 2350 | 1,230 |
| 26 | 70 | 30 | — | 2560 | 3,500 |
| 27 | 60 | 40 | — | 3460 | 6,450 |
| 28 | 50 | 50 | — | 3550 | 21,000 |
| 29 | 90 | — | 10 | 1885 | 790 |
| 30 | 80 | — | 20 | 2155 | 1,700 |
| 31 | 70 | — | 30 | 2365 | 5,400 |
| 32 | 60 | — | 40 | 2830 | 22,000 |
| 33 | 50 | — | 50 | 3110 | 35,000 |

TABLE V

Sheeting from Blends of Suspension Chlorinated Polyethylene
(Run 5 of Table I) and Post-Chlorinated Polyvinyl Chloride
or Non-Chlorinated Polyvinyl Chloride

| Blend No. | CPE (48% Cl.) (pts. by wt.) | CPVC (pts. by wt.) | PVC (pts. by wt.) | Ultimate Tensile (psi at 23°C) | Stiffness (psi at 25°C) |
|---|---|---|---|---|---|
| 34 | 100 | 0 | — | 2120 | 560 |
| 35 | 90 | 10 | — | 2300 | 560 |
| 36 | 80 | 20 | — | 2780 | 1,030 |
| 37 | 70 | 30 | — | 3140 | 2,340 |
| 38 | 60 | 40 | — | 3200 | 9,650 |
| 39 | 50 | 50 | — | 4030 | 19,900 |
| 40 | 90 | — | 10 | 1950 | 640 |
| 41 | 80 | — | 20 | 2170 | 1,500 |
| 42 | 70 | — | 30 | 2400 | 5,350 |
| 43 | 60 | — | 40 | 2660 | 10,600 |
| 44 | 50 | — | 50 | 2670 | 30,200 |

A comparison of the data presented in Tables II through V illustrates the unexpected reduction in stiffness obtained (along with enhanced tensile strength) when utilizing the blends of specified suspension chlorinated polyethylene in combination with a post-chlorinated polyvinyl chloride, as contrasted to otherwise equivalent blends but wherein the nonchlorinated polyvinyl chloride was used as a replacement for its after-chlorinated derivative. That this is unexpected and could not be predicted is illustrated by the fact that the post-chlorinated polyvinyl chloride material is significantly stiffer than its nonchlorinated derivative, i.e., the post-chlorinated polyvinyl chloride has a tensile strength of about 1200 psi and an Izod brittle point of 0.25 ft./lbs. per inch of notch whereas its nonchlorinated derivative has a tensile strength of about 7,500 psi and an Izod brittle point of 0.75 ft./lbs. per inch of notch.

Further, by way of comparison, a series of blends were prepared as described herein using the solution chlorinated polyethylene identified as Run Number 1 of Table I as a replacement for the prescribed suspension chlorinated materials. The following Table VI sets forth this data.

TABLE VI

Sheeting from Blends of Solution Chlorinated Polyethylene (Run 1 of Table I) and After-Chlorinated Polyvinyl Chloride

| Blend No. | CPE (35% Cl.) (pts. by wt.) | CPVC (pts. by wt.) | Ultimate Tensile (psi at 23°C) | Stiffness (psi at 25°C) |
| --- | --- | --- | --- | --- |
| 45 | 80 | 20 | 1000 | 420 |
| 46 | 70 | 30 | 745 | 830 |
| 47 | 60 | 40 | 450 | 2,070 |
| 48 | 50 | 50 | 1020 | 10,230 |

A comparison of the data of Table VI with the data of Tables II through V illustrates that the utilization of a solution chlorinated polyethylene as a replacement for the prescribed suspension chlorinated polyethylenes significantly reduces the ultimate tensile strength properties of sheeting prepared from such blends as compared to a significant increase in ultimate tensile strength when suspension chlorinated polyethylene is used. Thus, it is apparent that the unexpectedly good results derived from the compositions of the present invention are not obtained when substituting solution chlorinated polyethylene for the prescribed suspension chlorinated polyethylene and could not be predicted by the addition of chlorinated polyvinyl chloride or polyvinyl chloride to solution chlorinated polyethylene.

It is further apparent from the data presented above that the sheet materials of the present invention are inherently flexible without the addition of plasticizers and, in addition, are resistant to weathering and burning and have desirable tensile strength, and dimensional stability under widely varying environmental conditions. Such materials are also capable of being easily welded to each other by application of conventional solvents such as methylethyl ketone, toluene, xylene and the like.

Sheets of desired width may be supplied in the form of convoluted rolls to the job site and thereafter, easily unrolled and cut into desired or required lengths and that individual sheets may then be welded together, if desired, utilizing conventional solvent welding and/or dielectric welding techniques as hereinbefore described.

By way of comparison, it has been shown that only the described chlorinated olefin polymer materials have the necessary combination of inherent flexibility and tensile strength.

By way of further illustration, it has been found that utilization of chlorinated olefin polymers having molecular weights of about 1 million or more are generally incapable of being fabricated into sheet-like structures without the addition of significant amounts of plasticizers or other processing aids. By way of specific illustration, it has been found that the non-plasticized chlorinated polyolefins as described in Example 1 above can be extruded through a standard Instron Rheometer orifice, using a 190°C. barrel temperature, at a 150 Sec-1 shear rate with a resultant shear stress of from 25-35 psi, whereas, under the same conditions chlorinated polyethylenes having a molecular weight of from 1 million to 5 million are characterized by a shear stress of greater than about 85 psi and often cannot be made to pass through the orifice of the rheometer.

Still further, it has been found that utilization of chlorinated polyolefins as herein described, but having a chlorine content of greater than about 50 weight percent provides sheet material having undesirably high modulus and reduced resistance to heat and light. Also, chlorinated polyolefins, as herein described, but having a chlorine content of less than about 25 weight percent are characterized by reduced solvent weldability properties.

It is further to be noted that the present invention contemplates the utilization of a chlorinated polyolefin wherein the chlorination is accomplished in suspension in an inert liquid. Such chlorination technique, as is well known to the art, eliminates the difficulties inherent in the solution chlorination of polyolefins. In addition, such chlorination technique provides a chlorination product characterized by regions in which a minor portion of the chlorine atoms along the polymer chain are distributed in a nonstatistical, blocktype fashion, while the remainder of the polymer is chlorinated in a random manner characteristic of that obtained by solution chlorination techniques. Thus, the chlorination product described herein might accurately be termed a "hybrid" since it possesses the desirable qualities of products prepared in ordinary suspension and ordinary solution chlorination methods, while eliminating some of the undesirable characteristics inherent in such prior known procedures and products.

What is claimed is:

1. Inherently flexible, high strength sheeting material consisting essentially of a blend of
    1. greater than 70 percent by weight of a chlorinated olefin polymer prepared by the suspension chlorination of an olefin polymer having an essentially linear structure, said olefin polymer being selected from the group consisting of polyethylene and interpolymers composed of at least about 90 mole percent ethylene with any remainder being at least one ethylenically unsaturated comonomer; such chlorinated olefin polymer containing from 25 to 50 weight percent of chemically combined chlorine wherein said chlorinated olefin polymer is characterized by regions in which a minor portion of the chlorine atoms along the polymer chain are distributed in a nonstatistical blocktype fashion while the remainder of the polymer is chlorinated in a random manner characteristic of that obtained by solution chlorination techniques, wherein said chlorinated olefin polymer has a relative crystallinity of less than about 10 percent and forms individual sheeting materials having a tensile strength of at least about 1,000 pounds per square inch, an elongation of between about 200 and 1,000 percent and a 100 percent modulus of between about 150 and 400 pounds per square inch; and
    2. between about 5 and less than 30 percent by weight of a post-chlorinated polyvinyl chloride containing from about 60 to 72 percent chlorine; said thermoplastic sheeting material having a thickness of about 0.005 to 0.25 of an inch and having an ultimate tensile strength of at least about 1,200 pounds per square inch at 23°C. as determined by ASTM Test Number D-412 and a stiffness of less than about 2,500 pounds per square inch at 25°C. as determined by ASTM Test Number D-797.

2. The sheet material of claim 1 wherein said chlorinated olefin polymer is chlorinated polyethylene.

3. The sheet material of claim 2 wherein said chlorinated polyethylene has a molecular weight of less than about 1,000,000.

4. The sheet material of claim 3 wherein said chlorinated polyethylene has a molecular weight of between about 20,000 and 300,000.

5. The sheet material of claim 4 wherein said chlorinated polyethylene contains between about 35 and 48 weight percent chlorine.

6. The sheet material of claim 5 wherein said after-chlorinated polyvinyl chloride contains about 68 percent chlorine.

* * * * *